United States Patent
Wilke et al.

(10) Patent No.: US 8,287,027 B2
(45) Date of Patent: Oct. 16, 2012

(54) SUPPORT ARM ASSEMBLY FOR A FOLDING TOP OF A VEHICLE

(75) Inventors: Gunnar Wilke, Lotte (DE); Holger Röder, Eislingen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/227,553

(22) Filed: Sep. 8, 2011

(65) Prior Publication Data

US 2012/0056443 A1    Mar. 8, 2012

(30) Foreign Application Priority Data

Sep. 8, 2010 (DE) .................. 10 2010 044 701

(51) Int. Cl.
*B60J 7/08* (2006.01)
(52) U.S. Cl. .................................. 296/107.09
(58) Field of Classification Search ............. 296/107.09, 296/107.18, 117, 122
See application file for complete search history.

(56) References Cited

U.S. PATENT DOCUMENTS

| | | | | |
|---|---|---|---|---|
| 3,030,140 | A * | 4/1962 | Probst ..................... | 296/107.09 |
| 5,385,381 | A * | 1/1995 | Moore et al. ................ | 296/117 |
| 5,806,912 | A * | 9/1998 | Ramaciotti et al. ...... | 296/107.09 |
| 5,816,644 | A | 10/1998 | Rothe et al. | |
| 5,829,821 | A * | 11/1998 | Aydt et al. ..................... | 296/122 |
| 5,903,119 | A | 5/1999 | Laurain et al. | |
| 6,048,021 | A * | 4/2000 | Sautter, Jr. .................... | 296/117 |
| 6,139,087 | A * | 10/2000 | Wolfmaier et al. ...... | 296/107.16 |
| 6,390,530 | B1* | 5/2002 | Maass ....................... | 296/107.09 |
| 2005/0242614 | A1* | 11/2005 | MacNee et al. .......... | 296/107.09 |
| 2006/0061129 | A1* | 3/2006 | Dilluvio ................... | 296/107.09 |
| 2008/0277963 | A1* | 11/2008 | Dietl ........................ | 296/107.09 |

FOREIGN PATENT DOCUMENTS

DE    10053236 A1    5/2002
EP    0749859 A1    12/1996

* cited by examiner

*Primary Examiner* — H Gutman
(74) *Attorney, Agent, or Firm* — Brooks Kushman P.C.

(57) ABSTRACT

A folding top apparatus for a vehicle includes a movable folding top and a support arm assembly. The folding top has front and rear roof parts and a corner bow. The support arm assembly includes a drive arm pivotably connected to the front roof part and pivotably connected to a main bearing, a coupling arm connected to the corner bow and pivotably connected to the drive arm, and a control arm pivotably connected to the main bearing and displaceably connected to the coupling arm whereby swivel motion of the corner bow is influenced by the coupling arm and the control arm.

20 Claims, 1 Drawing Sheet

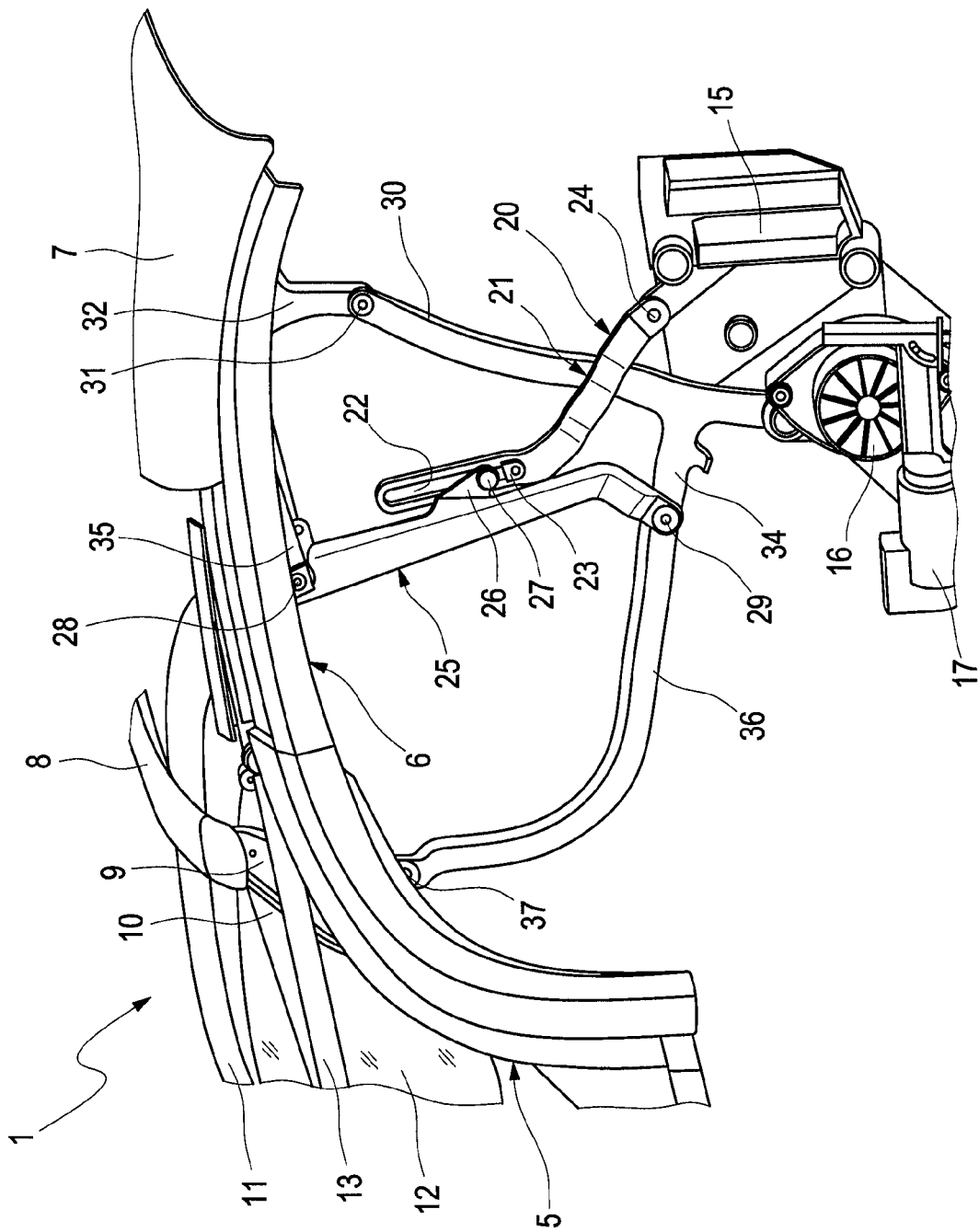

SUPPORT ARM ASSEMBLY FOR A FOLDING TOP OF A VEHICLE

CROSS-REFERENCE TO RELATED APPLICATIONS

This application claims foreign priority benefits under 35 U.S.C. §119(a)-(d) to DE 10 2010 044 701.3, filed Sep. 8, 2010, which is hereby incorporated by reference in its entirety.

TECHNICAL FIELD

The present invention relates to folding tops for vehicles.

BACKGROUND

A movable roof such as a folding top for a vehicle has multiple rigid roof parts. Movable connecting elements such as support arms movably connect the roof parts to one another and/or the vehicle body. The support arms enable the roof parts to swivel or fold relative to one another such that the roof may be moved between closed and opened roof positions. The support arms are articulately mounted at one end on the roof parts and are pivotably supported at the other end on the vehicle body. The roof may include a fabric cover which covers the roof and spans the roof parts.

The individual roof parts displace relative to one another when the roof moves between the closed and opened positions. In the closed position, the roof parts are extended next to one another along the longitudinal direction of the vehicle and cover the passenger compartment of the vehicle with the fabric cover being stretched over the roof parts. In the opened position, the roof parts with the cover are folded together and stored in a rear holding region of the vehicle such that the passenger compartment is uncovered. The support arms are driven by electric or hydraulic means to move and thereby move the roof parts between the closed and opened positions.

The selection, design, and dimensioning of the support arms determine the pattern and speed of motion of the roof parts during closing and opening of the roof. The fabric cover undergoes a fold formation motion sequence corresponding to the motion of the roof parts as the roof moves between the closed and opened roof positions.

DE 109 13 356 C2 describes a folding top for a vehicle such as a convertible. The folding top longitudinally extends between the windshield and the rear end region of the vehicle. The folding top has front, middle, and rear roof parts and a fabric cover which spans the roof parts. On both longitudinal sides of the folding top, a support arm parallelogram assembly movably connects the front and middle roof parts and a bent support arm, which forms a C-pillar, movably connects the middle roof part to the vehicle body. The bent support arm is extended in a projection beyond the middle roof part and engages with this extension in a slotted opening in the rear support arm of the parallelogram assembly. Via the engaged extension of the bent support arm, the motion of the parallelogram assembly is driven between the front and middle roof parts. The front roof part is driven via the slotted opening. The slotted opening is also used for length compensation between the extension of the support arm and the intersecting motion of the rear support arm of the parallelogram assembly.

DE 100 53 236 A1 describes a collapsible roof for a vehicle. The front region of the fabric cover is fastened to the front roof part. The rear region of the cover is mounted on the vehicle body. A mounting part is connected to the front roof part. Two support arms are pivotably mounted on their ends to the mounting part and vehicle body. In the middle position of the rear support arm, a U-shaped top bow is supported at its free ends on the rear main arm. The free ends of the top bow engage in an arched slotted opening in a control arm via a toggle lever. The upper end of the control arm is pivotably mounted on the mounting part between upper articulated points of the two main arms. The downwardly directed end of the control arm is accommodated in an arched slotted opening in the rear main arm. The lower end of the control arm slides in the slotted opening in the rear main arm via a connected bolt as the roof is being moved such that the angled end of the top bow swivels in the upper slotted opening in the control arm in correspondence to the curvature of the motion of the control arm. The swiveling of the top bow moves the top bow from a position in which the cover is tensioned into a position in which the cover is loose. In this manner, when the roof is being opened, the cover may fold up to enable the roof to collapse and be stored in the rear holding space of the vehicle. The top bow thus follows a predetermined curved path via a control arm located between the mounting part and the rear support arm while swiveling and linear motions occur. There is no connection of the control arm to the main bearing of the overall roof kinematics system on at least one side.

U.S. Pat. No. 3,030,140 describes a support arm assembly for a movable vehicle roof. The roof includes a fabric cover which at its rear end is connected to the vehicle body via a holding device. A main arm is supported in a main bearing. The main arm has multiple projecting lever regions to which support arms, control arms, or other drive elements are fastened. The main arm with a coupling arm is situated in the region of the C-pillar of the roof. A flat corner bow pointing to the rear has arched extensions on its end facing the passenger compartment. The arched extensions have a slotted opening which engages with a protruding lever of the main arm. The main arm and the slotted opening are joined together by a bolt. The bolt may be displaced in the slotted opening in correspondence with motion of the roof. The slotted opening in the extension of the top bow is used for controlling the cover tension and ensures that the top bow produces additional cover tension when the roof is closed. The top bow is supported on a protruding lever region of the main arm via an additional coupling arm. The extended, arched end region of the top bow and the coupling arm form a linkage mechanism. The end region of the top bow facing the passenger compartment has a curved extension in the direction of forward vehicle travel, which at its end is mounted in a three-point lever. The lever is connected to the main arm via a separate coupling rod which extends parallel to the main arm.

SUMMARY

An object of the present invention relates to displacing a top bow of a folding top such that the top bow undergoes a predetermined pattern of motion as a function of the motion of the folding top in which the top bow displacement may be easily and cost-effectively carried out using relatively few components.

In carrying out the above object and other objects, the present invention provides a folding top apparatus for a vehicle. The folding top apparatus includes a movable folding top and a support arm assembly. The folding top has front and rear roof parts and a corner bow. The support arm assembly includes a drive arm pivotably connected to the front roof part and pivotably connected to a main bearing, a coupling arm connected to the corner bow and pivotably connected to the drive arm, and a control arm pivotably connected to the main bearing and displaceably connected to the coupling arm whereby swivel motion of the corner bow is influenced by the coupling arm and the control arm.

Further, in carrying out the above object and other objects, the present invention provides a vehicle having a vehicle body with a passenger compartment, a folding top, and a support arm assembly. The folding top has front and rear roof parts movable between a closed position in which the folding top covers a passenger compartment and an opened position in which the folding top is moved away from covering the passenger compartment. The folding top further has a corner bow. The support arm assembly includes a drive arm pivotably connected to the front roof part and pivotably connected to the vehicle body, a coupling arm connected to the corner bow and pivotably connected to the drive arm, and a control arm pivotably connected to the vehicle body and displaceably connected to the coupling arm whereby swivel motion of the corner bow is influenced by the coupling arm and the control arm.

An embodiment of the present invention provides a support arm assembly for a folding top (i.e., movable roof) of a vehicle. The folding top includes multiple roof parts including a C-pillar and a front roof part having a roof cap, a fabric cover which covers and spans the roof parts, and least one top bow with the at least one top bow including a corner bow. The support arm assembly movably connects the roof parts to one another and/or the vehicle body to enable the roof parts to swivel or fold relative to one another such that the folding top may be moved between closed and opened positions. In the closed position, the roof parts are extended next to one another along the longitudinal direction of the vehicle and cover the passenger compartment of the vehicle with the cover being stretched over the roof parts. In the opened position, the roof parts with the cover are folded together and stored in a rear holding region of the vehicle such that the passenger compartment is uncovered. The support arm assembly (one on each longitudinal side of the folding top) includes a drive arm, a coupling arm, and a control arm. The drive arm movably connects the front roof part to a main bearing of the vehicle body. The coupling arm and the control arm influence the swivel motion of the corner bow as the folding top is moved. To this end, the coupling arm is connected at one end to the corner bow and is pivotably fastened at the opposite end to the drive arm via a secondary bearing. The control arm at one end is displaceably mounted on the coupling arm. The control arm at its opposite end is pivotably supported on the main bearing.

A support arm assembly in accordance with embodiments of the present invention is directed to a folding top having individual lateral roof parts and one or more top bows (including a corner bow) which produce tension in the edge region of a fabric cover spanning the folding top. When the folding top is closed, the cover extends from the region of the upper edge of the windshield of the vehicle to the rear end region of the vehicle, whereby the portion of the cover near the windshield may be fastened to the roof cap and the rear portion of the cover may be held and fastened by a device such as a clamping bracket in a holding region of the vehicle body. The top bows extend laterally across and over the passenger compartment when the folding top is closed to thereby stabilize the cover and produce fabric tension. The top bows are connected to the cover such as via elastic connecting elements or by insertion into pockets in the cover. The connection between the top bows and the cover enables the cover to fold and collapse in predetermined positions when the folding top is being closed or opened. The top bows are to swivel out of their position tensioning the cover (when the folding top is closed) so that the fabric tension is reduced and the cover is thus able to move in the direction of the predetermined folded position. Without swiveling out of the top bows, the fabric tension as the roof is moving could increase to such an extent that the cover may be destroyed. In addition, as indicated, a targeted folded position or motion of the cover is applied to the cover via the top bows. For this purpose, the ends of the top bows have mountings which are connected to the roof parts or other support arms of the roof kinematics system. The ends of the top bows, or the mountings at the ends of the top bows, are connected to the drive arms via the coupling arms in order to control motion of the top bows. Free swiveling of the top bows is possible despite these connections.

To produce a targeted pattern of motion and/or speed of motion of a top bow, the coupling arm connected to an end of the top bow is connected to an additional support arm in the form of the control arm. The coupling arm engages in a slotted opening in the control arm via a bolt or sliding member projecting from the coupling arm. The control arm, as a result of its support on the coupling arm on the vehicle body side, is compelled to follow a specified pattern of motion. The slotted opening in the control arm may be curved. Superimposed motions and changes in speed may thus be achieved during the overall motion process of the roof.

The end regions of the slotted opening in the control arm function as end stops for the bolt (or the slide block or sliding member). The bolt is connected to the coupling arm via a mounting. In order to reduce impacts and avoid noise when the end positions between the bolt and the slotted opening in the control arm are reached, stop dampers in the form of rubber caps, rubber cushions, or other elastic elements are introduced in the slotted opening in the control arm. A spring may be inserted between one end of the slotted opening and the sliding bolt. By use of the spring, a starting motion of the coupling arm and the top bow may be initiated during initial motion of the folding top. A damper element in the form of a telescoping damper or the like may be mounted parallel to the slotted opening.

As the end regions of the slotted opening in the control arm may be used as a stop for the motion of the coupling arm, it is advantageous to integrate the stop dampers or limit stops situated parallel thereto. The fabric tension via the sliding bolt in the slotted opening in the control arm can be monitored using suitable sensors so that the motion process of the folding top may be terminated when fabric tensions are excessive.

For accommodating the sliding member of the coupling arm, the mounting may likewise have a slotted opening or a movable mounting may engage in the slotted opening in the control arm. The ends of the coupling arm and the top bow may be situated in a secondary bearing on the roof kinematics system so that via this connection the slotted opening in the control arm may act on additional roof parts and function as an end stop. The control arm having the slotted opening is a passive support arm which is able to carry out its function for controlling a top bow via the motion of the folding top.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

Exemplary embodiments of the present invention are illustrated in the drawings and explained in greater detail in the following description. Identical, similar, or functionally equivalent components are denoted by the same reference numerals.

BRIEF DESCRIPTION OF THE DRAWINGS

FIG. 1 illustrates a support arm assembly for a folding top of a vehicle in accordance with an embodiment of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a support arm assembly for a folding top 1 (i.e., a movable roof) of a vehicle in accordance with an embodiment of the present invention is shown. Folding top 1 includes a front roof part 6 and a rear roof part 5. Rear roof part 5 forms a C-pillar on both longitudinal sides of folding top 1 (only one longitudinal side of folding top 1 shown in FIG. 1). Front roof part 6 includes a roof cap 7. Folding top 1 further includes a fabric cover which covers and spans roof parts 5, 6. Folding top 1 further includes top bows 8 and 11 with top bow 11 being a corner bow. Top bows 8 and 11 extend laterally across folding top 1 between the longitudinal sides of folding top 1.

The support arm assembly movably connects roof parts 5, 6 to one another and/or the vehicle body to enable roof parts 5, 6 to swivel or fold relative to one another such that folding top 1 may be moved between closed and opened positions. In the closed position (shown in FIG. 1), roof parts 5, 6 are extended next to one another along the longitudinal direction of the vehicle and cover the passenger compartment of the vehicle with the cover being stretched over roof parts 5, 6. In the opened position, roof parts 5, 6 with the cover are folded together and stored in a rear holding region of the vehicle such that the passenger compartment is uncovered.

The support arm assembly (one on each longitudinal side of folding top 1) includes a drive arm 30, a coupling arm 25, a control arm 20, a front support arm 35, and a rear support arm 36. Support arm kinematics of the support arm assembly as well as coupling arm 25 are controlled via control arm 20 for moving corner bow 11 in a targeted manner.

The fabric cover extends between the two C-pillars 5 and is tensioned by corner bow 11. To this end, corner bow 11 is connected to the fabric cover. A rear window 12 is integrated into the fabric cover in the rear region of folding top 1. Rear window 12 is made of glass or transparent plastic. Rear window 12 is connected to the fabric cover either directly or via mounting devices. The side regions of rear window 12 are connected by coupling struts 13 or braces 10 to make the targeted pattern of motion of rear window 12 possible such that rear window 12 is moved to a predetermined position when folding top 1 is opening.

Top bow 8 is positioned between corner bow 11 and front roof cap 7. Top bow 8 is connected via a respective mounting 9 (one on each longitudinal side of folding top 1) to C-pillars 5. Alternatively, top bow 8 is connected via respective mountings 9 to front roof part 6. Rear window 12 in its side region is pivotably connected to rear support arm 36 via a secondary bearing 37. The other end of rear support arm 36 remote from rear window 12 is pivotably accommodated in a secondary bearing 29 of drive arm 30.

When folding top 1 is being moved, rear support arm 36 undergoes a swivel motion via drive arm 30 and transmits this motion via secondary bearing 37 to rear window 12 and/or coupling strut 13 or brace 10. In turn, top bow 8 is moved by braces 10, 13. Coupling strut 13 may also act as a drive element for C-pillar 5.

The end of drive arm 30 opposite of front roof part 6 is pivotably fastened to a main bearing 15 of the vehicle body. A swivel motion may be transmitted to drive arm 30 via a drive motor 17, a linkage mechanism 16, and other drive elements. The end of drive arm 30 adjacent front roof part 6 is pivotably connected in a secondary bearing 31 of a lever 32 belonging to either roof part 6 or roof cap 7.

Coupling arm 25 is pivotably accommodated at one end in the shared secondary bearing 29 between rear support arm 36 and a protruding lever 34 of drive arm 30. Coupling arm 25 is connected at another end on the folding top side to front support arm 35 via a secondary bearing 28. Front support arm 35 is a connecting element between the individual roof parts. Corner bow 11 is connected at one end to coupling arm 25 in secondary bearing 28.

Coupling arm 25 is connected to main bearing 15 via control arm 20 to enable coupling arm 25, and thus corner bow 11, to undergo a targeted pattern of motion when folding top 1 is closing or opening. For this purpose, coupling arm 25 has a mounting 26 in its middle position. Mounting 26 has sliding member such as a bolt 27. Control arm 20 includes a slotted opening 22. Sliding member 27 slidably engages in slotted opening 22 in control arm 20. Control arm 20 further includes a bend 21. Bend 21 enables control arm 20 to move past drive arm 30 when folding top 1 is moving. Control arm 20 is pivotably connected to main bearing 15 via a secondary bearing 24. Secondary bearing 24 may be a swivel bearing or a cardanic bearing.

Protruding lever 34 of drive arm 30 may be a pivotable support arm having appropriate stops to limit the mobility of rear support arm 36 and coupling arm 25.

Slotted opening 22 in control arm 20 may have a linear or curved shape. The ends of slotted opening 22 represent stops for bolt 27 of mounting 26. The mobility of corner bow 11 is controlled via these stops. A stop damper 23 is integrated inside slotted opening 22 to prevent noise or excessively rough end stops. Stop damper 23 may be made of an elastomer. Stop damper 23 may be clipped or glued in slotted opening 22 or introduced and held in the slotted opening using a clamping device.

Control arm 20 passes between the fabric cover and coupling arm 25 and between the passenger compartment and coupling arm 25 when folding top 1 is opening or closing. Coupling arm 25 and control arm 20 are located in the rear fabric region of C-pillar 5.

Top bow 8 may likewise be moved via a coupling arm and a control arm in which case a connection is between coupling arm 25 and top bow 8. Depending on the design of control arm 20 and its leverage, control arm 20 may be made of flat metal and produced by bending and punching, or may be made of a plastic and produced by extrusion. Control arm 20 can be drivable directly via the drive unit via a suitable connection thus allowing corner bow 11 to be actively displaced.

LIST OF REFERENCE NUMERALS

1 Folding top
5 Rear roof part
6 Front roof part
7 Roof cap
8 Top bow

9 Mounting
10 Brace
11 Corner bow
12 Rear window
13 Coupling strut
15 Main bearing
16 Linkage mechanism
17 Drive motor
20 Control arm
21 Bend
22 Slotted opening
23 Stop damper
24 Secondary bearing
25 Coupling arm
26 Mounting
27 Bolt
28 Secondary bearing
29 Secondary bearing
30 Drive arm
31 Secondary bearing
32 Lever
34 Protruding lever
35 Front support arm
36 Rear support arm
37 Secondary bearing While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A folding top apparatus for a vehicle, the apparatus comprising:
    a movable folding top having front and rear roof parts and a corner bow; and
    a support arm assembly including a drive arm pivotably connected to the front roof part and pivotably connected to a main bearing, a coupling arm connected to the corner bow and pivotably connected to the drive arm, and a control arm pivotably connected to the main bearing and displaceably connected to the coupling arm whereby swivel motion of the corner bow is influenced by the coupling arm and the control arm.

2. The apparatus of claim 1 wherein:
    the coupling arm is connected to the corner bow via a secondary bearing.

3. The apparatus of claim 1 wherein:
    the control arm has a slotted opening and the coupling arm has a mounting with a member, wherein the member slidably engages with the slotted opening such that the control arm is displaceably connected to the coupling arm.

4. The apparatus of claim 3 wherein:
    the slotted opening of the control arm is linear.

5. The apparatus of claim 3 wherein:
    the control arm includes a bended portion which enables the control arm to move past the drive arm when the folding top is moving.

6. The apparatus of claim 3 wherein:
    the control arm includes a stop damper on an end of the slotted opening.

7. The apparatus of claim 1 wherein:
    the control arm includes at least one of metal and plastic.

8. The apparatus of claim 1 wherein:
    the drive arm includes a protruding lever, wherein the coupling arm is pivotably connected to the protruding lever of the drive arm at a secondary bearing such that the coupling arm is pivotably connected to the drive arm.

9. The apparatus of claim 8 wherein:
    the support arm assembly further includes a rear support arm, wherein the rear support arm is connected to the rear roof part and is pivotably connected to the coupling arm at the secondary bearing.

10. The apparatus of claim 1 wherein:
    the support arm assembly further includes a rear support arm, wherein the rear support arm is connected to the rear roof part and is pivotably connected to the drive arm and the coupling arm.

11. The apparatus of claim 1 wherein:
    the rear roof part of the folding top is a C-pillar.

12. The apparatus of claim 1 wherein:
    the folding top includes a top bow other than the corner bow.

13. A vehicle comprising:
    a vehicle body having a passenger compartment;
    a folding top having front and rear roof parts movable to and from a closed position in which the folding top covers a passenger compartment, the folding top further having a corner bow; and
    a support arm assembly including a drive arm pivotably connected to the front roof part and pivotably connected to the vehicle body, a coupling arm connected to the corner bow and pivotably connected to the drive arm, and a control arm pivotably connected to the vehicle body and displaceably connected to the coupling arm whereby swivel motion of the corner bow is influenced by the coupling arm and the control arm.

14. The vehicle of claim 13 wherein:
    the control arm has a slotted opening and the coupling arm has a mounting with a member, wherein the member slidably engages with the slotted opening such that the control arm is displaceably connected to the coupling arm.

15. The vehicle of claim 14 wherein:
    the slotted opening of the control arm is linear.

16. The vehicle of claim 14 wherein:
    the control arm includes a bended portion which enables the control arm to move past the drive arm when the folding top is moving.

17. The vehicle of claim 13 wherein:
    the drive arm includes a protruding lever, wherein the coupling arm is pivotably connected to the protruding lever of the drive arm at a secondary bearing such that the coupling arm is pivotably connected to the drive arm.

18. The vehicle of claim 17 wherein:
    the support arm assembly further includes a rear support arm, wherein the rear support arm is connected to the rear roof part and is pivotably connected to the coupling arm at the secondary bearing.

19. The vehicle of claim 13 wherein:
    the support arm assembly further includes a rear support arm, wherein the rear support arm is connected to the rear roof part and is pivotably connected to the drive arm and the coupling arm.

20. The vehicle of claim 13 wherein:
    the rear roof part of the folding top is a C-pillar.

* * * * *